UNITED STATES PATENT OFFICE.

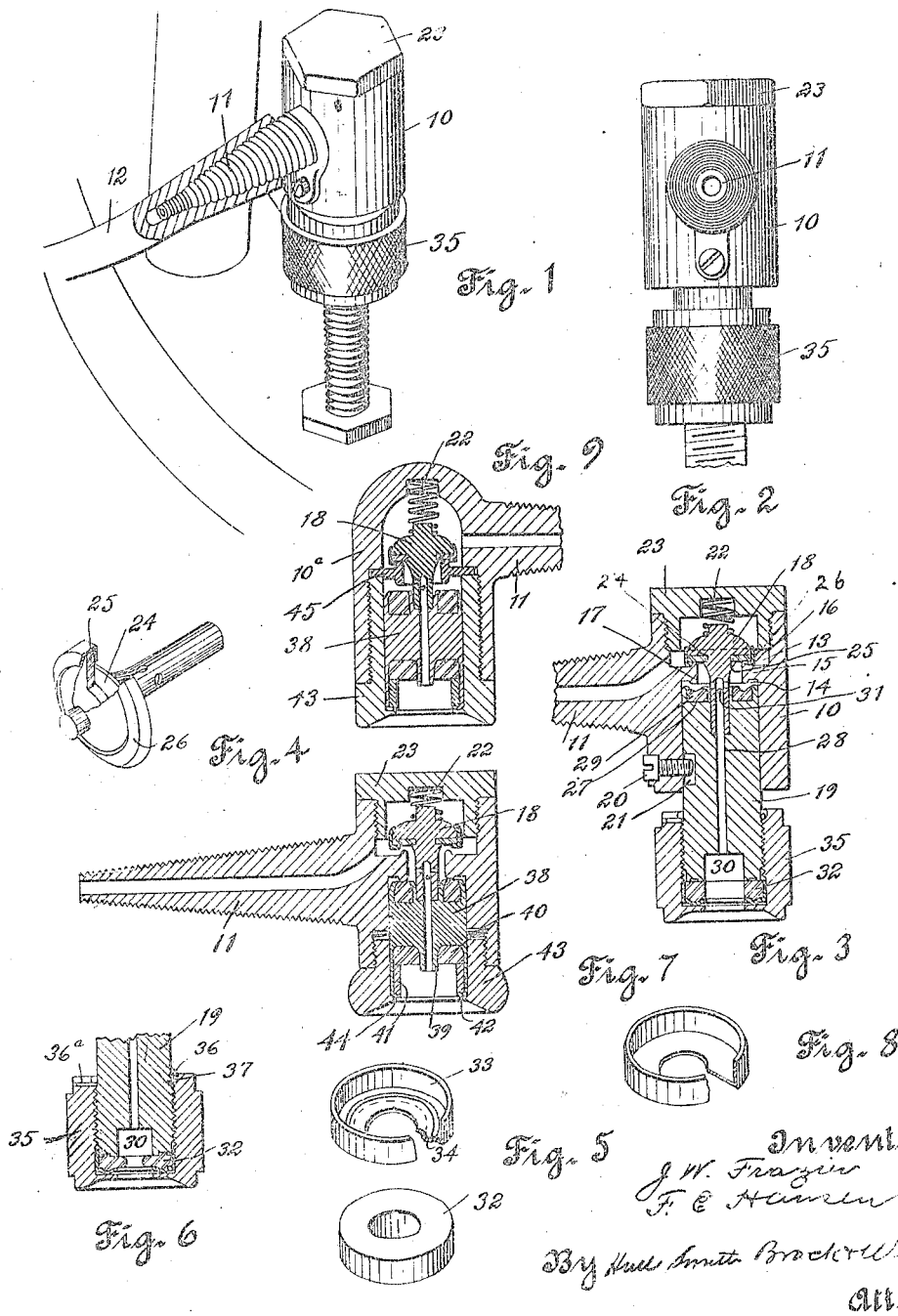

JAMES W. FRAZIER AND FRED E. HANSEN, OF CLEVELAND, OHIO.

COUPLING DEVICE.

1,207,739. Specification of Letters Patent. Patented Dec. 12, 1916.

Application filed September 13, 1915. Serial No. 50,344.

*To all whom it may concern:*

Be it known that we, (1) JAMES W. FRAZIER, (2) FRED E. HANSEN, citizens of the United States, residing at Cleveland, in the county of Cuyahoga and State of Ohio, have invented a certain new and useful Improvement in Coupling Devices, of which the following is a full, clear, and exact description, reference being had to the accompanying drawings.

This invention relates generally to tire inflaters and more particularly to a novel construction of valve connection between the air supply and the tire to be inflated.

The object of the invention is to provide an exceedingly simple and highly efficient device which can be connected to an air supply pipe and which will normally be closed against the escape of air but readily opened when the device is connected to the inflating valve of the tire.

Another object of the invention is to provide a simple and efficient connection between the coupling and the tire valve whereby the escape of air at that point will be completely avoided, and another object is to provide means for preventing the elastic tire valve gripping means from becoming impaired by contacting with threads or other moving parts of the coupling.

Heretofore elastic packing rings have been employed for encircling the stem of the tire valve, and tight fits have been obtained by compressing the elastic packing ring between two opposed surfaces, but usually the ring has expanded laterally both internally and externally, and consequently has come in contact with the threads or other moving parts during compression, and very soon becomes impaired; and one object, therefore, of this invention is to provide a packing ring which shall be so arranged as to permit interior expansion for the purpose of gripping the tire valve stem, but arrest the exterior lateral expansion and prevent the outer edge of said elastic ring coming in contact with the threads or other moving parts of the coupling.

Another object of the invention is to provide novel forms of contacting surfaces whereby a positive contact at all times is obtained thereby reducing leakage to a minimum.

With these and certain other objects in view, the invention consists in the novel features of construction and combination hereinafter fully described and pointed out in the claims.

In the drawings forming a part of this specification Figure 1 is a perspective view showing the practical application of our invention; Fig. 2 is a face view of the same; Fig. 3 is a vertical sectional view; Fig. 4 is a detailed perspective view partly in section of the valve; Fig. 5 is a detail perspective view of the elastic ring and its cup or container; Fig. 6 is a detailed sectional view showing the said ring compressed or expanded; Fig. 7 is a vertical sectional view illustrating a slight modification; Fig. 8 is a view showing a still further modification; and Fig. 9 a modified construction of casing.

In the practical embodiment of our invention we employ a casing 10, which has a bored extension 11, to which the air supply pipe 12 is attached. The casing 10 is bored from each end providing an upper chamber 13, and a lower chamber 14, and an intermediate partition 15, which is apertured centrally and formed with the upper valve seat 16 and lower valve seat 17 respectively. A valve 18 is arranged within the upper chamber 13 and a plug or plunger 19 is fitted into the lower chamber 14 and secured by a set screw 20 to prevent rotation but has a limited vertical movement by providing a recess 21 in the side of plug and into which the inner end of the set screw fits.

The valve 18 is held upon the seat 16 by a spring 22 pressed downwardly by means of the cap 23 screwed into the top of the casing and having the upper end of the spring 22 seated in a recess formed in the inner face thereof. The valve 18 is shouldered and grooved at 24 to receive the rubber face 25 in the form of a ring, said ring being retained by means of a metallic shell 26 spun around the periphery of the valve and engaging the edges of the valve and rubber ring and maintaining said ring in its proper position at all times, the rubber face thereof contacting with the annular seat 16.

The upper end of the plug or plunger 19 is formed with an annular groove 27 which surrounds the central bore or passage 28, and seated in this annular groove 27 is a rubber ring 29 the edges of the groove being rolled or peened over the rubber ring to hold the same in place. This construction provides an elastic seat at the upper end of the plug or plunger which engages the annular valve seat 17 and completely cuts off the escape of air when the plug or plunger is moved upwardly in the case 10. The central bore or passage 28 extends entirely through the plug or plunger and communicates at its lower end with a chamber 30 which is adapted to receive the extreme end of the tire valve. The upper end of the bore or passage 28 is slightly enlarged to receive the depending stem of the valve 18 which stem is hollow and perforated as shown at 31 so that air can pass from the passage 11 through the valve stem to the tire valve when the valve 18 is unseated.

The valve 18 is normally held seated upon the seat 16 by the spring 22, but when the plug or plunger is pushed upwardly to bring its elastic seat into contact with the seat 17, the valve 18 will be unseated by virtue of the plug or plunger engaging the depending valve stem and carrying the valve upwardly, so that communication is established between the bores 11 and 28 through the apertured hollow valve stem 31 and by this construction the air from the hose can pass to the tire stem.

In order to provide a perfectly tight connection between the tire valve and the lower end of the plug or plunger we employ an elastic ring 32 which is placed directly beneath the end of the plug or plunger and has a central opening of the same diameter as the chamber 30. This elastic ring 32 is placed in a cup or container 33 having a central aperture of the same size as the ring and chamber 30 said cup being open at the top and upon the bottom is provided with an annular corrugation 34 but this corrugation can be omitted if desired as shown in Fig. 8. A nut 35 preferably having a left hand thread is screwed upon the lower end of the plug or plunger 19 and at its lower end is shaped to receive the cup 33 with ring 32 the opening in the bottom of the nut being coextensive with the chamber 30, opening in ring 32, and cup 33 so that the end of the outer valve can be readily inserted in the chamber 30. Then by turning the nut, the elastic ring 32 is compressed and as it cannot expand laterally and outwardly, it expands laterally and inwardly as shown in Fig. 6 and firmly grips the tire valve stem thereby providing a perfectly tight connection at this point and at the same time prevents the outer edges of the elastic ring coming into contact with the threads or moving parts of the coupling and avoids cutting up or otherwise impairing the elastic ring.

In order to prevent the nut being turned down too far we preferably construct the upper face thereof with an annular groove 36 notched at 36ª and arrange a spring wire ring 37 therein which serves to lock the nut and prevent its withdrawal from the plug or plunger.

In Fig. 7 we have shown a slight modification in which the plug or plunger 38 is formed at its lower end with a depending nipple 39 surrounding the central bore or passage and the lower face of said plunger is provided with an annular groove to receive the elastic packing ring 40 held in place by a ring 41 which in turn is secured by rolling over the extreme lower edges 42 of the plug or plunger. The nut 43 screws up into the lower end of the casing instead of screwing upon the plug or plunger and is provided with an inwardly projecting shoulder 44 which engages the lower end of the plug or plunger and prevents the same dropping out. The hose connection valve and other parts are exactly the same as previously described. When it is desired to connect this type of coupling to a tire valve it is only necessary to insert the end of the valve into the chamber 45 so that the nipple 39 enters the end of the valve stem and said stem contacts with the elastic packing ring 40 and then by pushing down upon the coupling the plug or plunger is forced upwardly so as to unseat the valve 18 and the air from the hose connection then passes through into the tire valve and the moment the coupling is disconnected from the outer valve the spring 22 immediately reseats the valve and cuts off the escape of air. The upper end of the plug or plunger is provided with the elastic face which contacts with the seat 17 and prevents the escape of air during the inflating process. It will be understood that certain other changes can be made to the various elements within the scope of the claims without departing from the broad principle of the invention.

In Fig. 9, we have shown a slightly modified form of casing 10ª which is bored from one end only as shown and avoids the use of the cap 23. The valve 18, movable plug 38 and nut 43 are exactly the same as shown in Fig. 7 but in the casing we arrange a double valve seat 45 which is held by the inner end of the nut against the shoulder formed within the casing. The operation of this modified form is exactly the same as the operation of the structures illustrated in Figs. 3 and 7.

From the above description taken in connection with the accompanying drawings it will be seen that we provide a simple and highly efficient form of coupling device capable of carrying out all of the objects hereinbefore referred to.

Having thus described our invention, what we claim is:—

1. The combination, with a casing having oppositely disposed valve seats, of a spring pressed valve and a movable plunger arranged to coöperate respectively with said seats, said plunger having an air passage extending therethrough, said valve having an apertured hollow stem adapted to contact with said plunger and aline with said air passage, said plunger carrying means at its outer end for tightly gripping a tire valve stem.

2. The combination, with a casing having opposed chambers with oppositely disposed valve seats arranged between said chambers, of a spring pressed valve coöperating with one seat and having a hollow apertured stem extending into the opposite chamber, a plunger independent of the valve adapted to coöperate with the other valve seat and having a limited movement in its chamber, said plunger having a central air passage adapted to be brought into communication with the hollow valve stem, said plunger at its opposite end being provided with means for engaging a tire valve stem.

3. In a device of the kind described, the combination with a casing having upper and lower chambers, the intermediate partition centrally apertured and provided with oppositely disposed valve seats, said casing having a bored hose connection communicating with the upper chamber, a valve located in the upper chamber having an elastic face contacting with the upper valve seat and a depending stem projecting through the partition, means for maintaining said valve seated, and a plug arranged in the lower chamber independent of the valve and contacting at its upper end with the depending stem of the valve, said plug having an elastic surface at its upper end, the lower end of said plug being shaped to receive a tire valve as set forth.

4. In a device of the kind described, the combination with a plunger having an air passage extending therethrough, a recess in the lower end of said plunger communicating with said air passage and adapted to receive a tire valve stem, a nut movable upon the lower end of said plunger, an elastic ring arranged at the end of the plunger and having a central aperture alining with the recess in said plunger, and a flanged apertured container between said nut and elastic ring for the purpose specified.

5. In a device of the kind described, the combination with a plunger having an air passage extending therethrough, a recess at the lower end thereof adapted to receive a tire valve stem, a nut movable upon the lower end of said plunger, the upper end thereof having an annular groove, a spring located in said groove, one end of said spring being connected to the nut, and means interposed between the nut and end of the plunger for gripping a tire valve stem as set forth.

In testimony whereof, we hereunto affix our signatures in the presence of a witness.

JAMES W. FRAZIER.
FRED E. HANSEN.

Witness:
HUGH B. MCGILL.